(12) United States Patent
Gunn (10) Patent No.: US 9,198,150 B2
(45) Date of Patent: Nov. 24, 2015

(54) LINK PATH DELAY ESTIMATOR THAT COMBINES COARSE AND FINE DELAY ESTIMATES

(71) Applicant: Raytheon Company, Waltham, MA (US)

(72) Inventor: Brian A. Gunn, Goleta, CA (US)

(73) Assignee: Raytheon Company, Waltham, MA (US)

( * ) Notice: Subject to any disclaimer, the term of this patent is extended or adjusted under 35 U.S.C. 154(b) by 56 days.

(21) Appl. No.: 14/245,248

(22) Filed: Apr. 4, 2014

(65) Prior Publication Data

US 2014/0253200 A1    Sep. 11, 2014

Related U.S. Application Data

(63) Continuation-in-part of application No. 13/788,098, filed on Mar. 7, 2013, now Pat. No. 9,071,234.

(51) Int. Cl.
*G01S 13/08* (2006.01)
*G01S 13/74* (2006.01)
(Continued)

(52) U.S. Cl.
CPC ............ *H04W 56/009* (2013.01); *H04B 3/462* (2013.01); *H04W 56/0015* (2013.01)

(58) Field of Classification Search
CPC ............ H04B 3/02; H04B 3/46; H04B 3/462; H04B 3/466; H04B 3/48; H04B 3/487; H04B 3/493; H04W 56/0055; H04W 56/0065; H04W 56/009; H04W 56/001; H04W 56/0015; H03K 5/13; H03K 5/14; G01S 3/02; G01S 3/14; G01S 3/46; G01S 3/50; G01S 5/02; G01S 5/12; G01S 7/02; G01S 7/021; G01S 13/74; G01S 13/82

USPC .......... 342/13, 20, 42–51, 59, 70–73, 82, 89, 342/94–97, 118, 125, 134–145, 165, 342/173–175, 192–197, 350, 385, 386, 387, 342/394; 375/130, 140–153, 211–215, 259, 375/260; 379/406.01, 406.06, 406.08, 379/406.1
See application file for complete search history.

(56) References Cited

U.S. PATENT DOCUMENTS 2,705,320 A    3/1955    Winslow
3,025,520 A    3/1962    Werner et al.
(Continued)

FOREIGN PATENT DOCUMENTS

EP    0616443 A2    9/1994
EP    1891700 B1    2/2013
(Continued)

OTHER PUBLICATIONS

"International Application Serial No. PCT/US2014/021046, International Search Report mailed Jun. 24, 2014", 3 pgs.
(Continued)

*Primary Examiner* — Bernarr Gregory
(74) *Attorney, Agent, or Firm* — Schwegman Lundberg & Woessner, P.A.

(57) ABSTRACT

A link-path delay estimator estimates a signal-path delay of a signal path between a master device and a remote device, by combining coarse delay estimates and a fine delay estimate. The coarse delay estimates indicate only an integral portion of the signal-path delay, selected as an integral multiple of a symbol period. The fine delay estimate indicates only a fractional portion of the signal-path delay, selected from a range of values that extends over one symbol period. The link-path delay estimator can combine the coarse and fine delay estimates using a first rule if the two most recent coarse delay estimates are equal, and a second rule if the two most recent coarse delay estimates differ. The coarse delay estimates can arise from both rising edges and falling edges of periodic signals sent along the signal path.

20 Claims, 5 Drawing Sheets

(51) Int. Cl.
*H04W 56/00* (2009.01)
*H04B 3/462* (2015.01)
*G01S 13/00* (2006.01)

(56) References Cited

U.S. PATENT DOCUMENTS

| | | | |
|---|---|---|---|
| 3,097,355 | A | 7/1963 | Hobrough et al. |
| 3,223,998 | A | 12/1965 | Eddy |
| 3,264,644 | A | 8/1966 | Jacob |
| 3,377,590 | A | 4/1968 | Wendell |
| 3,530,467 | A | 9/1970 | Attwood et al. |
| 4,041,381 | A | 8/1977 | Hwa |
| 4,562,573 | A | 12/1985 | Murano et al. |
| 4,620,788 | A | 11/1986 | Giger |
| 5,528,183 | A | 6/1996 | Maturi et al. |
| 5,878,032 | A | 3/1999 | Mirek |
| 6,211,812 | B1 | 4/2001 | Chiles et al. |
| 6,359,479 | B1 | 3/2002 | Oprescu |
| 6,477,674 | B1 | 11/2002 | Bates et al. |
| 6,545,979 | B1 | 4/2003 | Poulin |
| 6,614,387 | B1 | 9/2003 | Deadman |
| 6,671,261 | B1 | 12/2003 | Cheung |
| 6,731,908 | B2 | 5/2004 | Berliner et al. |
| 6,920,155 | B2 | 7/2005 | Rao |
| 6,943,595 | B2 | 9/2005 | Sugimoto et al. |
| 7,139,957 | B2 | 11/2006 | Querbach et al. |
| 7,199,751 | B2 | 4/2007 | Mikami et al. |
| 7,248,205 | B2 | 7/2007 | Uchino |
| 7,259,713 | B1 | 8/2007 | Matich et al. |
| 7,330,148 | B2 | 2/2008 | Takenouchi et al. |
| 7,359,408 | B2 | 4/2008 | Kim |
| 7,525,483 | B2 | 4/2009 | Eberlein |
| 7,533,285 | B2 | 5/2009 | Naffziger et al. |
| 7,714,777 | B2 | 5/2010 | Fukuda |
| 7,765,074 | B2 | 7/2010 | Kim et al. |
| 8,861,623 | B2 * | 10/2014 | Jonsson et al. ............... 375/260 |
| 9,071,234 | B2 * | 6/2015 | Gunn et al. .............. H03K 5/14 |
| 2005/0276318 | A1 | 12/2005 | Bokhour |
| 2006/0140392 | A1 * | 6/2006 | Ahmadi .................... 379/406.1 |
| 2007/0109175 | A1 | 5/2007 | Fukuda |
| 2011/0115669 | A1 | 5/2011 | Milyutin et al. |
| 2011/0122020 | A1 | 5/2011 | Henkel |
| 2012/0176271 | A1 | 7/2012 | Dai et al. |
| 2014/0253387 | A1 | 9/2014 | Gunn et al. |

FOREIGN PATENT DOCUMENTS

| | | |
|---|---|---|
| WO | WO-2006/108227 A1 | 10/2006 |
| WO | WO-2014/138345 A1 | 9/2014 |

OTHER PUBLICATIONS

"International Application Serial No. PCT/US2014/021046, Written Opinion mailed Jun. 24, 2014", 9 pgs.

"U.S. Appl. No. 13/788,098, Non Final Office Action mailed Dec. 26, 2014", 8 pgs.

"U.S. Appl. No. 13/788,098, Notice of Allowance mailed Feb. 27, 2015", 8 pgs.

"U.S. Appl. No. 13/788,098, Response filed Feb. 6, 2015 to Non Final Office Action mailed Dec. 26, 2014", 13 pgs.

* cited by examiner

LINK PATH DELAY ESTIMATOR THAT COMBINES COARSE AND FINE DELAY ESTIMATES

CROSS-REFERENCE TO RELATED APPLICATION

This application is a continuation-in-part of application Ser. No. 13/788,098, filed on Mar. 7, 2013, now U.S. Pat. No. 9,071,234, the entirety of which is incorporated by reference herein.

GOVERNMENT RIGHTS

This invention was made with Government support under Contract Number FA8625-11-C-6600 awarded by the Department of Defense. The Government has certain rights in this invention.

TECHNICAL FIELD

Examples relate to signal-path delay estimation between electronic components. Some examples relate to signal-path delay estimation in systems of spatially-distributed sensors. Some examples relate to signal-source location including geo-location. Some examples relate to determining clock-phase separation of spatially-distributed subsystems. Some examples relate to radar-warning receiver (RWR) systems.

BACKGROUND

Electronic communication between distinct components within a system experiences a delay associated with the signal path. Systems may need to compensate for this delay appropriately for the successful implementation of certain functions and/or algorithms. For example, a device receiving reports from one or multiple remote sensors over fiber-optic links may compensate for the signal path delay to correctly record the times at which observations are made. Similarly, a synchronization pulse sent from one device and received by one or multiple other devices may not result in a synchronized system unless the signal path delay is accounted for. Many conventional techniques for signal-path delay estimation do not provide sufficient resolution for some applications, such as systems of spatially-distributed sensors, signal-source location systems and RWR systems.

Thus, there are general needs for systems and methods for high-resolution signal-path delay estimation. There are also general needs for high-resolution signal-path delay estimation suitable for use in systems of spatially-distributed sensors. There are also general needs for high-resolution signal-path delay estimation suitable for signal-source location and RWR systems.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
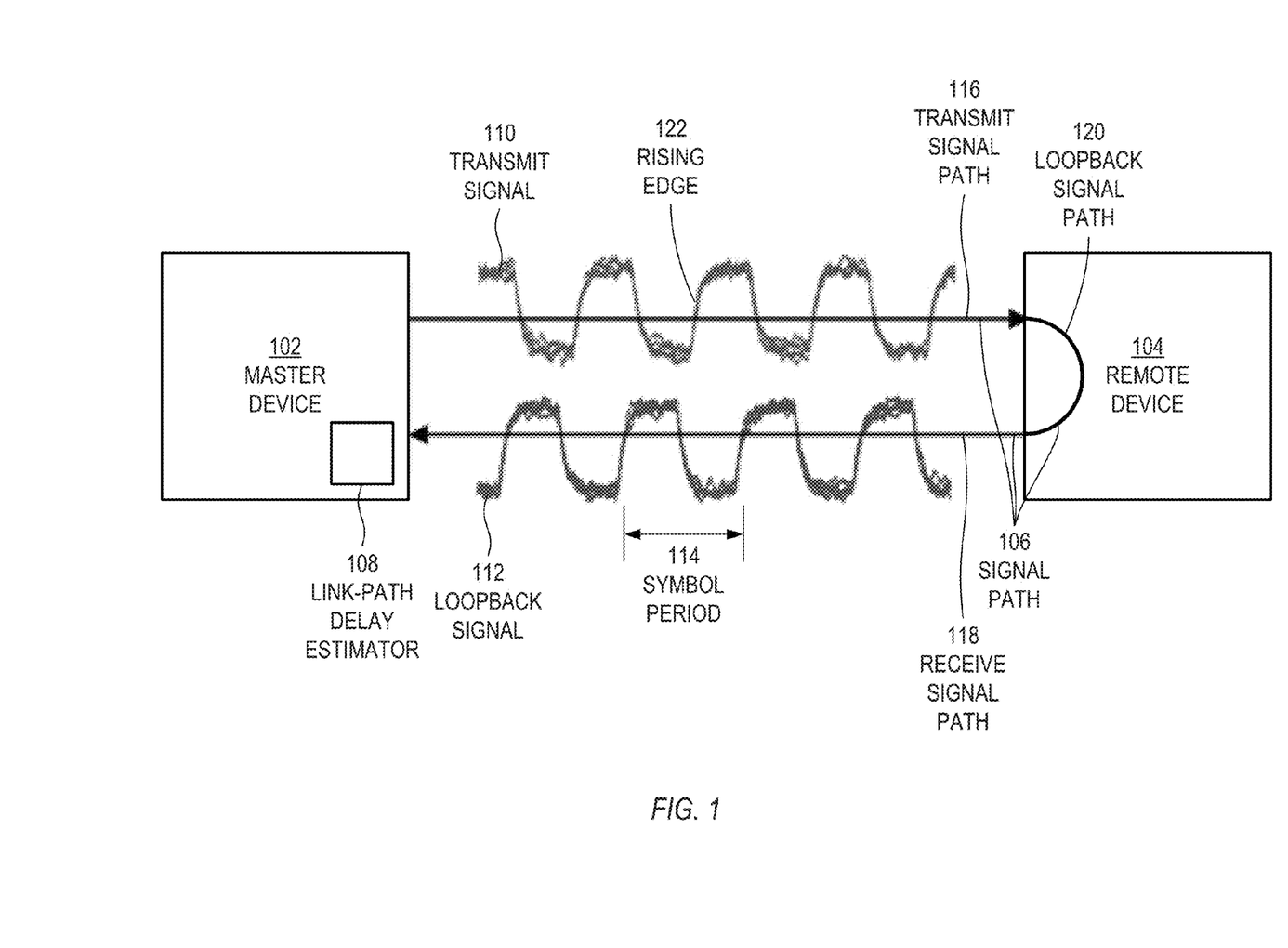
FIG. 1 is a functional diagram illustrating the estimation of a signal-path delay between an example of a master device and an example of a remote device.

FIG. 1 is a functional diagram illustrating an example of the estimation of a signal-path delay between a master device and a remote device. Master device 102 and remote device 104 are configured to communicate electronic signals over signal path 106. FIG. 1 shows but one example of signal-path delay estimation; other examples can also be used.

The master device 102 can include a link-path delay estimator 108 that can estimate a signal-path delay of the signal path 106 between the master device 102 and the remote device 104. The link-path delay estimator 108 can provide a transmit signal 110 that can include a waveform of alternating symbols. The link-path delay estimator 108 can phase-shift the transmit signal 110 by one of a plurality of phase-shift values and can sample a loopback signal 112 to generate a sampled signal output. The loopback signal 112 can be a delayed version of the transmit signal 110 that is returned from the remote device 104 after traveling signal path 106. The link-path delay estimator 108 can also correlate a noise-reduced version of the sampled signal output with a step function to generate a correlation value for each of the phase-shift values. The link-path delay estimator 108 can also step through at least some of the phase-shift values to select one of the phase-shift values to generate a fine-delay estimate. The fine-delay estimate can be added to a coarse delay estimate to determine the signal-path delay. The coarse delay estimate can be an estimate of the signal-path delay to a nearest symbol period 114 of the transmit signal 110. The fine-delay estimate can be an estimate of the signal-path delay to within a fraction of the symbol period 114.

The signal path 106 can include a transmit signal path 116, a receive signal path 118 and a loopback signal path 120. The loopback signal path 120 can be within the remote device 104. The estimate of the signal-path delay of the signal path 106 between the master device 102 and the remote device 104 generated by the link-path delay estimator 108 can be a round-trip signal delay between the master device 102 and the remote device 104. The signal-path delay estimate can include signal delays of the transmit signal path 116, the receive signal path 118, and the loopback signal path 120.

The transmit signal 110 can be a waveform of alternating symbols or bits, such as a square wave as illustrated in FIG. 1, or can be another suitable waveform. The master device 102 can include signal generating circuitry to generate the transmit signal 110 and to transmit the transmit signal 110 over the transmit signal path 116. The link-path delay estimator 108 can sample the loopback signal 112 on rising edges 122 of the phase-shifted transmit signal to generate the sampled signal output, although this is not a requirement.

In some examples, the master device 102 and remote device 104 can be configurable to operate in one of either an asynchronous loopback mode or a data-transfer mode. During asynchronous loopback mode, the remote device 104 can refrain from clocking or re-clocking signals received from the master device 102. In asynchronous loopback mode, the remote device 104 can receive the transmit signal 110 over the transmit signal path 116 from the master device 102, and can return the transmit signal via the receive signal path 118 without clocking or re-clocking the transmit signal 110. During data transfer mode, the remote device 104 can communicate data with the master device 102. In some examples, asynchronous loopback mode can be entered into as part of a calibration procedure. During data transfer mode, a serial data link can be established between the master device 102 and the remote device 104 during which data clocking or re-clocking can be performed.

In some examples, the transmit signal path 116 and the receive signal path 118 are fixed signal paths and can include, for example, conventional signal wire, such as copper wire and/or fiber. In these examples, the master device 102 and the remote device 104 can be at fixed locations relative to each other and the signal-path delay of the signal path 106 can be estimated to within a fraction of the symbol period 114 of the transmit signal 110. Although the signal path can be fixed, environmental conditions such as temperature can also affect the signal-path delay. In some alternate examples, the transmit signal path 116 and/or the receive signal path 118 can include wireless links, such as optical, radio-frequency (RF) or microwave links, although the scope of the examples is not limited in this respect.

In some examples, master device 102 can communicate with a plurality of remote devices. In these examples, the link-path delay estimator 108 can estimate a signal-path delay of the signal path between the master device 102 and each remote device. In some of these examples, the link-path delay estimator 108 can estimate a relative signal-path delay of the signal paths between the master device 102 and the remote devices, rather than an absolute signal-path delay.

In some examples, master device 102 and/or remote device 104 can be implemented in one or a combination of hardware, firmware and software. Examples can also be implemented as instructions stored on a computer-readable storage device, which may be read and executed by at least one processor to perform the operations described herein. A computer-readable storage device can include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, master device 102 and/or remote device 104 can include one or more processors and can be configured with instructions stored on a computer-readable storage device.

Figure 2:
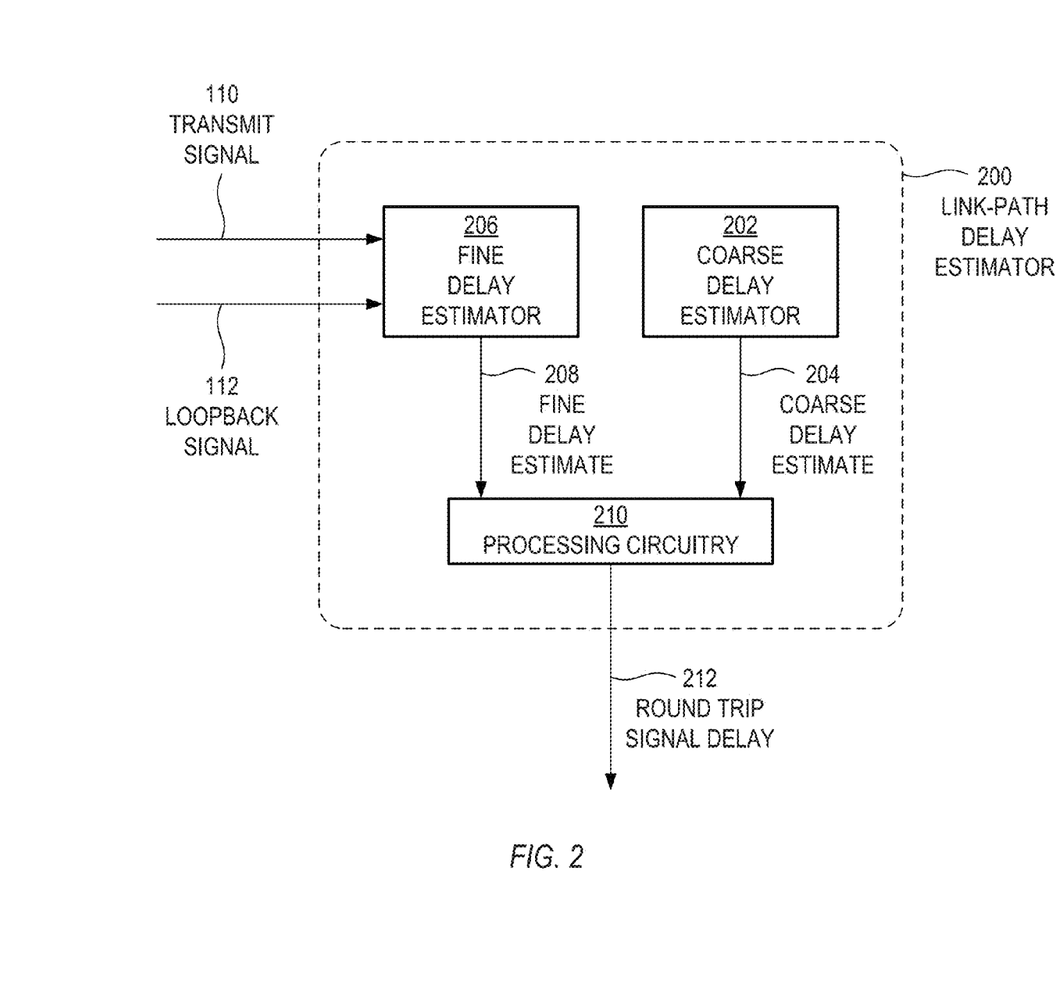
FIG. 2 is a functional block diagram of an example of a link-path delay estimator.

FIG. 2 is a functional block diagram of an example of a link-path delay estimator 200. The link-path delay estimator 200 of FIG. 2 is suitable for use as link-path delay estimator 108 (FIG. 1), although other link-path delay estimators can also be used.

The delay between the transmit signal 110 and the loopback signal 112 can be expressed in terms of symbol periods 114 (FIG. 1). In general, the delay can be an integral number of symbol periods, plus a fraction of a symbol period. The fraction can be expressed as a decimal number, such as between 0 and 1, or between −0.5 and +0.5, as a percentage, such as between 0% and 100%, or −50% to 50%, or as a phase, such as between 0 degrees and 360 degrees, or between −180 degrees and +180 degrees. Other suitable units can also be used, and other suitable offsets (e.g., placement of the center of the range of the symbol period) can be used.

A fine delay estimator 206 can be configured to generate a fine delay estimate 208 between a transmit signal 110 and a loopback signal 112. The transmit and loopback signals 110, 112 can be periodic with a symbol period (e, g, can return to the same portion of the periodic cycle after a time interval of the symbol period). The loopback signal 112 can be a delayed version of the transmit signal 110 that is returned from the remote device on the signal path. The fine delay estimate 208 can indicate only a fractional portion of the signal-path delay, selected from a range of values that extends over one symbol period. In some examples, the fine delay estimator 206 can assign one of only a specified number of values, such as 256, to the fine delay estimate 208, so that the fine delay estimate can be estimated to within $\frac{1}{256}^{th}$ of the symbol period. An example of a technique for determining a fine delay estimate, for example, can be found in U.S. patent application Ser. No. 13/788,098, which is incorporated by references herein in its entirety.

A coarse delay estimator 202 can be configured to provide a coarse delay estimate 204. The coarse delay estimate can indicate only an integral portion of the signal-path delay, selected as an integral multiple of the symbol period. In some examples, the coarse delay estimator 202 provides multiple coarse delay estimates for each symbol period. In some examples, the coarse delay estimator 202 provides coarse delay estimates at multiple discrete phase shifts of the transmit and loopback signals, 110 and 112, thus providing multiple coarse delay estimates for each symbol period. In some examples, the coarse delay estimator 202 provides coarse delay estimates at both rising edges and falling edges of the square-wave transmit and loopback signals, 110 and 112, thereby providing two coarse delay estimates obtained at 180-degree phase shifts for each symbol period.

In one example of a coarse delay estimator, the master device 102 (FIG. 1) transmits an alternating sequence of high and low voltages, with one high/low cycle every symbol period. The master device intentionally misses one transition between low and high voltage in the transmission. The signal having the missing transition travels along the transmit signal path, along the loopback signal path, and along the receive signal path, then returns to the master device. The master device correlates the received sequence of high and low voltages with the transmitted sequence of high and low voltages. When the received and transmitted sequences line up, the correlation produces a delay value. The delay value can be processed as needed, can be rounded off suitably, and can be output from the coarse delay estimator 202 as the coarse delay estimate 204. In some examples, the coarse delay estimate 204 represents the closest integral number of symbol periods in the link-path delay. In other examples, the coarse delay estimate 204 is the largest integral number of symbol periods in the link-path delay. This is but one example of a coarse delay estimator 202; other suitable coarse delay estimators can also be used. Other conventional techniques for determining a coarse delay estimate, for example, can be found in U.S. Pat. No. 7,359,408, U.S. Pat. No. 6,920,155 and U.S. Pat. No. 6,545,979.

Processing circuitry 210 can be configured to combine the coarse and fine delay estimates 204, 208 into a round trip signal delay 212. The coarse and fine delay estimates 204, 208 can form respective integral and fractional portions of the round trip signal delay 212. The round trip signal delay can indicate the signal-path delay to within a fraction of a symbol period.

The processing circuitry 210 can be configured to combine the coarse and fine delay estimates 204, 208 differently, depending on the values of the coarse and fine delay estimates 204, 208. In some examples, the processing circuitry 210 can be configured to combine the coarse and fine delay estimates

204, 208 using a first rule if two coarse delay estimates obtained at 180-degree phase shifts are equal, and a second rule if the two coarse delay estimates obtained at 180-degree phase shifts differ.

In some examples, the first rule can include: comparing the fine delay estimate to a first threshold; if the fine delay estimate is less than the first threshold, forming the round trip signal delay as a sum of the fine delay estimate and the most recent coarse delay estimate plus one symbol period; and if the fine delay estimate is greater than the first threshold, forming the round trip signal delay as a sum of the fine delay estimate and the most recent coarse delay estimate. In some examples, the first threshold can be between 0% and 50% of a symbol period, exclusive. In some examples, the first threshold can be 25% of a symbol period.

In some examples, the second rule can include: comparing the fine delay estimate to a second threshold; if the fine delay estimate is less than the second threshold, forming the round trip signal delay as a sum of the fine delay estimate and the most recent coarse delay estimate; and if the fine delay estimate is greater than the second threshold, forming the round trip signal delay as a sum of the fine delay estimate and the most recent coarse delay estimate minus one symbol period. In some examples, the second threshold can be between 50% and 100% of a symbol period, exclusive. In some examples, the second threshold can be 75% of a symbol period.

A fine delay estimator 206 can generate an estimate of the fractional portion of the link-path delay. The full link-path delay is the integral portion, generated by the coarse delay estimator 202, plus the fractional portion, generated by the fine delay estimator 206. The fine delay estimator 206 can provide the fraction portion as a fine time data output 208. An example of a fine delay estimator 206 delays a transmit signal 110 (FIG. 1) by one of a plurality of delay values, samples a loopback signal 112 (FIG. 1), reduced the noise of the sampled loopback signal, correlates the noise-reduced sampled loopback signal with a step function to generate a correlation value for each of the delay values, delays the transmit signal by a selected one of the delay values, and generates the fine time data output 208 based on the correlation value. This is but one example of a fine delay estimator 206; other suitable fine delay estimators can also be used.

Processing circuitry 210 combines the coarse delay estimate 204 and the fine time data output 208 to produce a round trip signal delay 212. Because the fine delay estimate 208 may represent an amount of phase shift or delay introduced to align the delayed transmit signal 110, the processing circuitry 210 can convert the fine delay estimate 208 to a time estimate having the same units as the coarse delay estimate 204 before such a combination.

Under certain circumstances, combining the coarse (integral) and fine (fractional) portions can be straightforward, performed by simple summation. However, two conditions can complicate the combination of the coarse and fine portions. In a first condition, the coarse and fine estimators 206 and 202 are not phase-matched (e.g., the inputs 110 and 112 into each estimator exhibit different relative phases, or estimators 206 and 202 introduce unequal delay biases). In these cases, a hypothetical increment in total round-trip signal delay may cause the fine delay value to flip from a maximum value to a minimum value, independent from an increment in coarse value, or vice versa. Similarly, a hypothetical decrement in total round-trip signal delay may cause the fine delay value to flip from a minimum value to a maximum value, independent from a decrement in coarse value, or vice versa. In a second condition, in the presence of noise the estimators 206 and 202 may produce largely varying outputs for an unchanged total round-trip signal path delay, particularly when the actual value of the fine delay is near its loop-around (maximum or minimum values) or when the total delay is near the coarse-delay increment/decrement threshold. These two conditions may occur in varying degrees independent of one another, potentially creating an error of one symbol period in the estimate of the link-path delay, which is problematic.

To address these circumstances, the coarse delay estimator 200 can be configured to obtain coarse-delay estimates at 0-degree and 180-degree phase shifts, (e.g. sample both on the rising edge and a falling edge of the signals, rather than only a rising edge or only a falling edge). Sampling in this manner can produce two coarse delay estimates per symbol period, rather than one per symbol period. The two coarse delay estimates can differ by zero or by one symbol period, but cannot differ by more than one symbol period. Using two coarse delay estimates per symbol period, plus the restriction that sequential coarse delay estimates cannot differ by more than one symbol period, can resolve ambiguities in combining coarse and fine delay estimates into a single round trip signal delay 212. In some examples, a coarse delay estimator having increased resolution can be used instead of, or in addition to, using two coarse estimates per symbol period.

Figure 3:
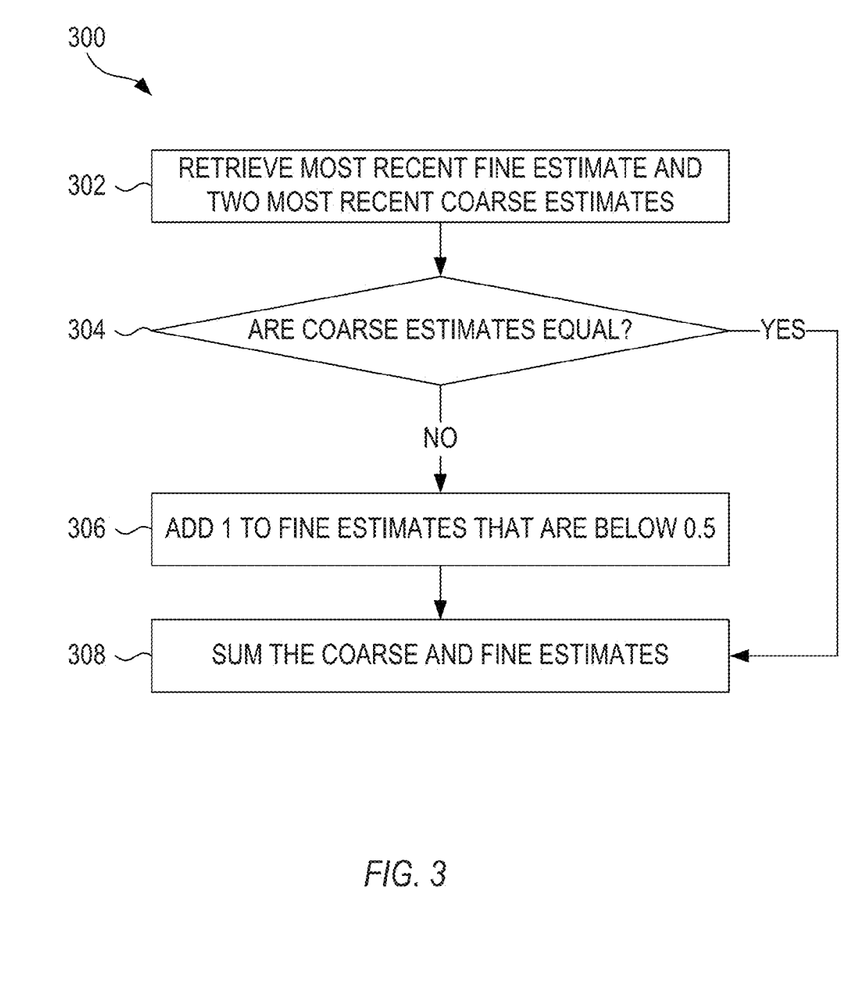
FIG. 3 is an example of a method for estimating a signal-path delay between a master device and a remote device.

FIG. 3 shows an example of a method 300 for estimating a signal-path delay between a master device and a remote device. Such a method can be executed by the signal processing circuitry 210 (FIG. 2), or by other suitable devices. Other suitable methods can also be used.

At 302, method 300 retrieves a most recent fine delay estimate and two most recent coarse delay estimates. As discussed above, the coarse delay estimates are in integer multiples of a symbol period, and the fine delay estimate is in fractional units of a symbol period, such as percentage (100% being a full symbol period), degrees (360 degrees being a full symbol period), or a decimal (1.0 being a full symbol period). At 304, method 300 compares the two most recent coarse delay estimates to each other. If the coarse delay estimates differ, method 300 proceeds to 306. At 306, method 300 adds 1 to estimates that are below 0.5. At 308, method sums the most recent coarse delay estimate and the fine delay estimate to form a signal-path delay. If the coarse delay estimates in 304 are equal, method 300 skips 306 and proceeds directly to 308.

In method 300 of FIG. 3, before the addition step 306, the loop-around point of the fine delay estimate is coincident with the loop-around point of the coarse delay estimate. The addition step 306 rotationally maps the fine delay estimate by 180 degrees in relation to the coarse delay estimate, so that the loop-around points are 180 degrees out of phase, rather than coincident. This reduces the susceptibility to noise in the loopback signal, and reduces or eliminates the possibility that one of the estimate will loop around while the other estimate does not.

Figure 4:
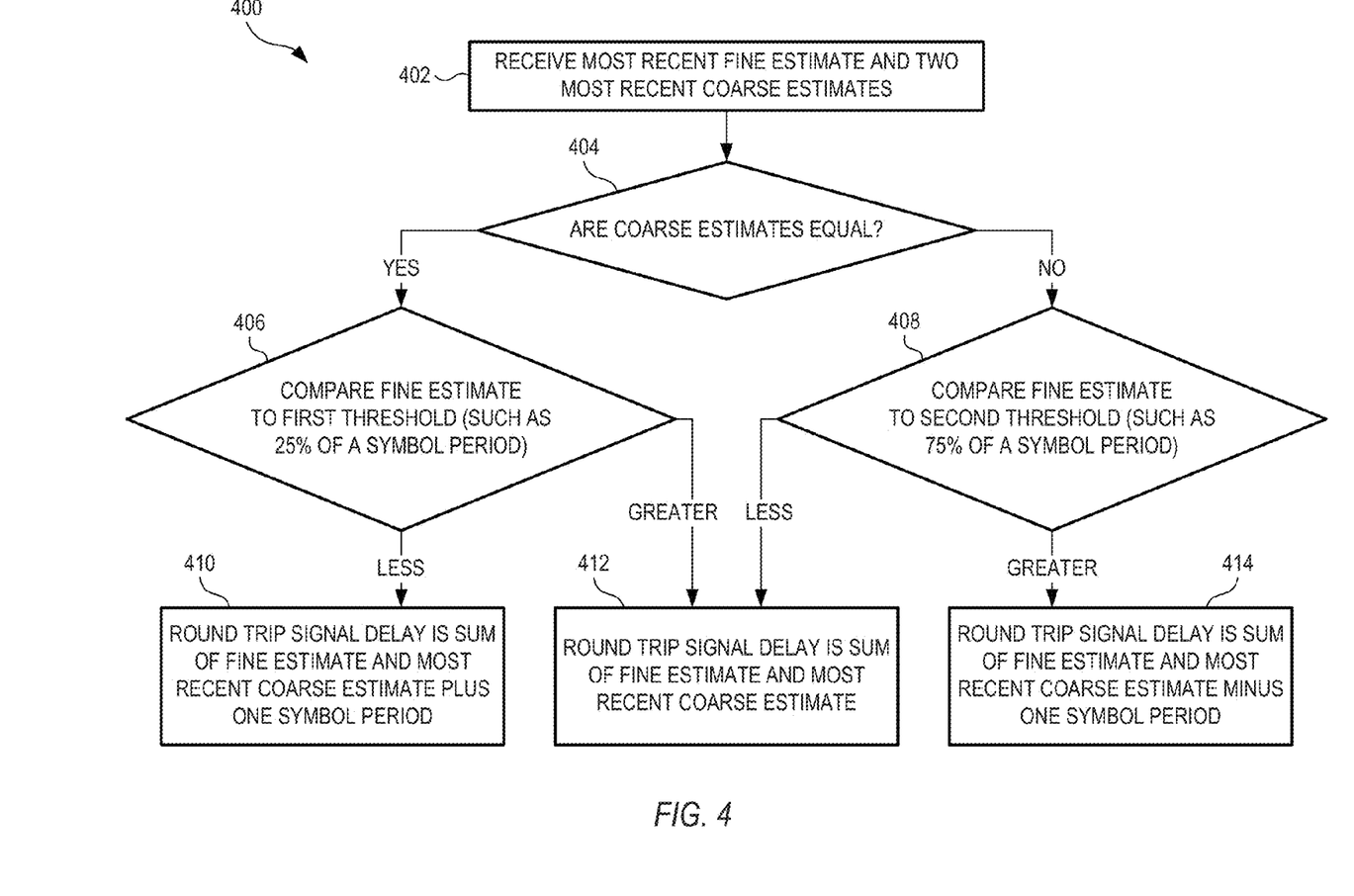
FIG. 4 is an example of another method for estimating a signal-path delay between a master device and a remote device.

FIG. 4 shows another example of a method 400 for estimating a signal-path delay between a master device and a remote device. Such a method can be executed by the signal processing circuitry 210 (FIG. 2), or by other suitable devices. Other suitable methods can also be used.

At 402, method 400 receives two most recent coarse delay estimates. In some examples, two coarse delay estimates are received for each symbol period. In some examples, the coarse delay estimates are received at both rising edges and falling edges of transmit and loopback signals. The coarse delay estimates indicate only an integral portion of the signal-path delay, selected as an integral multiple of a symbol period. At 402, method 400 also receives a fine delay estimate. The fine delay estimate indicates only a fractional portion of the signal-path delay, selected from a range of values that extends over one symbol period.

At 404, method 400 compares the two most recent coarse delay estimates to each other. If the two most recent coarse delay estimates are equal, method 400 proceeds to 406. If the two most recent coarse delay estimates differ, method 400 proceeds to 408 (discussed below).

At 406, method 400 compares the fine delay estimate to a first threshold. The first threshold can be between 0% and 50%, exclusive, 10% and 40%, exclusive, 20% and 30%, exclusive, 25%, or another suitable value. For this example, percentages represent a percent of a symbol period. If, at 406, the fine delay estimate is less than the first threshold, method 400 proceeds to 410. At 410, method 400 forms a round trip signal delay as a sum of the fine delay estimate and the most recent coarse delay estimate, plus one symbol period. If, at 406, the fine delay estimate is greater than the first threshold, method 400 proceeds to 412. At 412, method 400 forms the round trip signal delay as a sum of the fine delay estimate and the most recent coarse delay estimate. If, at 406, the fine delay estimate equals the first threshold, either or both 410 and 412 may be selected; both 410 and 412 produce the same round trip signal delay for this case.

Returning to 404, if, at 404, the two most recent coarse delay estimates differ, method 400 proceeds to 408. At 408, method 400 compares the fine delay estimate to a second threshold. The second threshold can be between 50% and 100%, exclusive, 60% and 90%, exclusive, 70% and 80%, exclusive, 75%, or another suitable value. For this example, percentages represent a percent of a symbol period. In some examples, the first and second thresholds can differ by 50% (or, equivalently, 0.5, or 180 degrees). If, at 408, the fine delay estimate is less than the second threshold, method 400 proceeds to 412. At 412, method 400 forms the round trip signal delay as a sum of the fine delay estimate and the most recent coarse delay estimate. If, at 408, the fine delay estimate is greater than the second threshold, method 400 proceeds to 414. At 414, method 400 forms a round trip signal delay as a sum of the fine delay estimate and the most recent coarse delay estimate, minus one symbol period. If, at 408, the fine delay estimate equals the first threshold, either or both 412 and 414 may be selected; both 412 and 414 produce the same round trip signal delay for this case.

Figure 5:
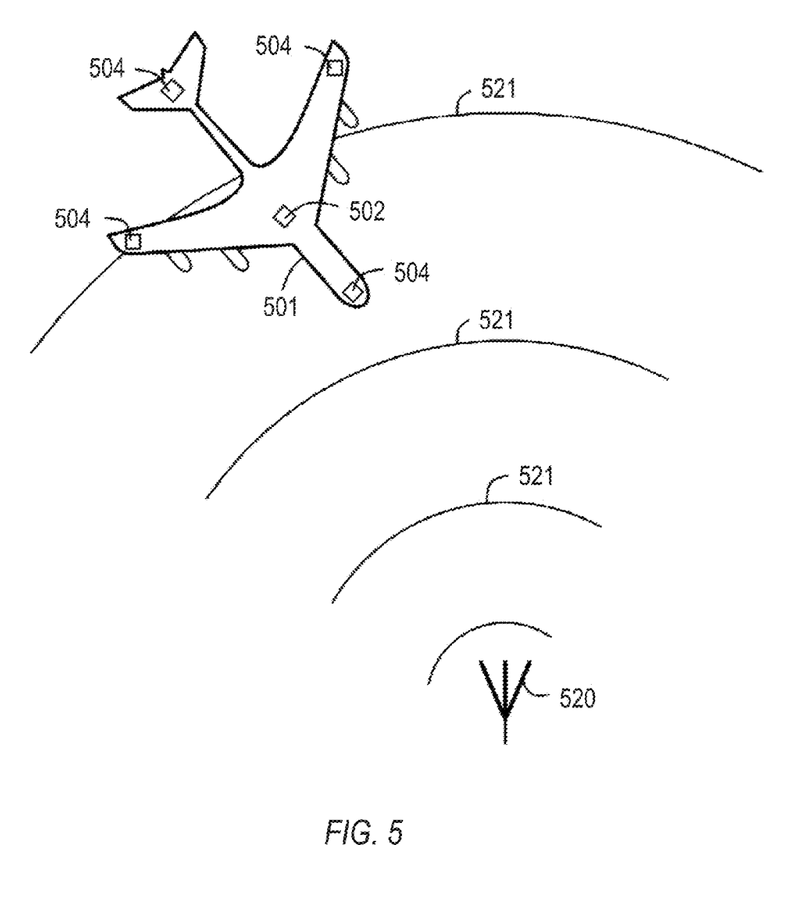
FIG. 5 illustrates the operation of an example of a signal-source locating system.

FIG. 5 illustrates the operation of an example of a signal-source locating system. Signal-source locating system can include a master device 502 and a plurality of spatially-distributed remote devices 504, each coupled to the master device 502 by a two-way signal path. The spatially-distributed remote devices 504 can be remote sensor devices. The signal-source locating system can be configured to determine a direction to a signal source 520 or locate the signal source 520 based on signals 521 emanating from the signal source 520.

The master device 502 may include a link-path delay estimator, such as link-path delay estimator 108 (FIG. 1), which can be arranged to estimate the relative signal-path delay between the master device 102 and each of the spatially-distributed remote devices 504.

In some examples, each of the spatially-distributed remote devices 504 may be arranged to detect and record time-of-arrivals (TOAs) of the signals and the master device 502 may compare the TOAs from the spatially-distributed sensors 504 to estimate a direction or geo-location of a signal source 520. The TOAs may be compensated based on the relative signal-path delays.

In some examples, the signal-source locating system may be part of a radar-warning receiver (RWR) system for use on an aircraft 501. In these examples, each of the spatially-distributed remote devices 504 may comprise a radar-warning receiver (RWR) arranged to detect and record time-of-arrivals of radar pulses 521. The master device 502 may compare the TOAs from the RWRs to estimate a direction (e.g., angle of incidence) or geo-location of a radar signal source 520.

The TOAs that are provided by the spatially-distributed remote devices 504 to the master device 502 can differ due to differences in the signal paths between the master device and each remote device 504 (e.g., approximate 3.3 ns per meter for signals traveling at the speed of light). In these examples, the master device 502 can compensate the TOAs based on the estimate of the signal-path delay determined by the link-path delay estimator to correctly determine the times at which observations are made to precisely estimate the direction of the source 520.

In some examples, clock-phase separation of spatially-distributed subsystems may be determined. In these examples, spatially-distributed remote devices 504 and the master device 502 may utilize synchronous clocks for communication of the TOA estimates. The use of the link-path delay estimator 200 (FIG. 2) can help reduce temporal unknown in data fusion from the remote devices 504, compensate for signal skew over the links and may allow the clock-phase separation to be determined for the spatially-distributed remote devices 504. For example, the master device 502 and the remote devices 504 can have a common clock source located at the master device 502. A counter in each remote device 504 may be reset by a pulse sent to each remote device 502 by the master device 102. If each remote device 504 were to report a concurrent event with a timestamp with the counter value at the time of occurrence, a discrepancy between the reports' timestamps would be observed due to the difference in delay of the reset pulse over each link and the difference in delay of the clock between the master device 502 and each remote device 504. The high-resolution link-path delay estimate may be used to compensate for this difference to determine the actual time of occurrence relative to the master clock or the clock of one remote device relative to another.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A link-path delay estimator to estimate a signal-path delay of a signal path between a master device and a remote device, the link-path delay estimator comprising:

a fine delay estimator configured to generate a fine delay estimate between a transmit signal and a loopback signal, the transmit and loopback signals being periodic with a symbol period, the loopback signal being a delayed version of the transmit signal that is returned from the remote device on the signal path, the fine delay estimate indicating only a fractional portion of the signal-path delay, selected from a range of values that extends over one symbol period;

a coarse delay estimator configured to provide a coarse delay estimate, the coarse delay estimate indicating only an integral portion of the signal-path delay, selected as an integral multiple of the symbol period; and processing circuitry configured to combine the coarse and fine delay estimates into a round trip signal delay, the coarse and fine delay estimates forming respective integral and fractional portions of the round trip signal delay, the round trip signal delay indicating the signal-path delay to within a fraction of a symbol period;

wherein the processing circuitry is configured to combine the coarse and fine delay estimates differently, depending on the values of the coarse and fine delay estimates.

2. The link-path delay estimator of claim 1, wherein the processing circuitry is configured to combine the coarse and fine delay estimates using a first rule if the two most recent coarse delay estimates are equal, and a second rule if the two most recent coarse delay estimates differ.

3. The link-path delay estimator of claim 2, wherein the first rule comprises:
comparing the fine delay estimate to a first threshold;
if the fine delay estimate is less than the first threshold, forming the round trip signal delay as a sum of the fine delay estimate and the most recent coarse delay estimate plus one symbol period; and
if the fine delay estimate is greater than the first threshold, forming the round trip signal delay as a sum of the fine delay estimate and the most recent coarse delay estimate.

4. The link-path delay estimator of claim 3, wherein the first threshold is between 0% and 50% of a symbol period, exclusive.

5. The link-path delay estimator of claim 3, wherein the first threshold is between 20% and 40% of a symbol period, exclusive.

6. The link-path delay estimator of claim 1, wherein the second rule comprises:
comparing the fine delay estimate to a second threshold;
if the fine delay estimate is less than the second threshold, forming the round trip signal delay as a sum of the fine delay estimate and the most recent coarse delay estimate; and
if the fine delay estimate is greater than the second threshold, forming the round trip signal delay as a sum of the fine delay estimate and the most recent coarse delay estimate minus one symbol period.

7. The link-path delay estimator of claim 6, wherein the second threshold is between 50% and 100% of a symbol period, exclusive.

8. The link-path delay estimator of claim 6, wherein the second threshold is between 70% and 80% of a symbol period, exclusive.

9. The link-path delay estimator of claim 1, wherein the coarse delay estimator provides two coarse delay estimates for each symbol period.

10. The link-path delay estimator of claim 9, wherein the coarse delay estimator provides coarse delay estimates at both rising edges and falling edges of the transmit and loopback signals.

11. A method for estimating a signal-path delay of a signal path between a master device and a remote device, the method comprising:
receiving two most recent coarse delay estimates, the coarse delay estimates indicating only an integral portion of the signal-path delay, selected as an integral multiple of a symbol period;
receiving a fine delay estimate, the fine delay estimate indicating only a fractional portion of the signal-path delay, selected from a range of values that extends over one symbol period;
comparing the two most recent coarse delay estimates to each other;
if the two most recent coarse delay estimates are equal:
comparing the fine delay estimate to a first threshold;
if the fine delay estimate is less than the first threshold, forming a round trip signal delay as a sum of the fine delay estimate and the most recent coarse delay estimate plus one symbol period; and
if the fine delay estimate is greater than the first threshold, forming the round trip signal delay as a sum of the fine delay estimate and the most recent coarse delay estimate; and
if the two most recent coarse delay estimates differ:
comparing the fine delay estimate to a second threshold;
if the fine delay estimate is less than the second threshold, forming the round trip signal delay as a sum of the fine delay estimate and the most recent coarse delay estimate; and
if the fine delay estimate is greater than the second threshold, forming the round trip signal delay as a sum of the fine delay estimate and the most recent coarse delay estimate minus one symbol period.

12. The method of claim 11,
wherein the first threshold is between 0% and 50% of a symbol period, exclusive; and
wherein the second threshold is between 50% and 100% of a symbol period, exclusive.

13. The method of claim 11, wherein the first threshold is between 20% and 30% of a symbol period, exclusive.

14. The method of claim 11, wherein the second threshold is between 70% and 80% of a symbol period, exclusive.

15. The method of claim 11, wherein two coarse delay estimates are received for each symbol period.

16. The method of claim 11, wherein each coarse delay estimate has a resolution smaller than a symbol period.

17. The method of claim 11, wherein the coarse delay estimates are received at both rising edges and falling edges of transmit and loopback signals.

18. A signal-source locating system comprising:
a master device;
a plurality of spatially-distributed remote devices, each coupled to the master device by a two-way signal path,
wherein the master device includes a link-path delay estimator that is arranged to estimate a relative signal-path delay between the master device and each of the spatially-distributed remote devices to within a fraction of a symbol period of a transmit signal,
wherein the link-path delay estimator is arranged to:
receive two most recent coarse delay estimates, the coarse delay estimates indicating only an integral portion of the signal-path delay, selected as an integral multiple of a symbol period;
receive a fine delay estimate, the fine delay estimate indicating only a fractional portion of the signal-path delay, selected from a range of values that extends over one symbol period;
compare the two most recent coarse delay estimates to each other; and
combine the coarse and fine delay estimates using a first rule if the two most recent coarse delay estimates are equal, and a second rule if the two most recent coarse delay estimates differ.

19. The signal-source locating system of claim 18, wherein the first rule comprises:
- comparing the fine delay estimate to a first threshold, the first threshold being between 0% and 50% of the symbol period, exclusive;
- if the fine delay estimate is less than the first threshold, forming the round trip signal delay as a sum of the fine delay estimate and the most recent coarse delay estimate plus one symbol period; and
- if the fine delay estimate is greater than the first threshold, forming the round trip signal delay as a sum of the fine delay estimate and the most recent coarse delay estimate.

20. The signal-source locating system of claim 18, wherein the second rule comprises:
- comparing the fine delay estimate to a second threshold, the second threshold being between 50% and 100% the symbol period, exclusive;
- if the fine delay estimate is less than the second threshold, forming the round trip signal delay as a sum of the fine delay estimate and the most recent coarse delay estimate; and
- if the fine delay estimate is greater than the second threshold, forming the round trip signal delay as a sum of the fine delay estimate and the most recent coarse delay estimate minus one symbol period.

\* \* \* \* \*